US008667993B2

(12) United States Patent
Donnelly

(10) Patent No.: US 8,667,993 B2
(45) Date of Patent: Mar. 11, 2014

(54) COMPOSITE HOSE WITH LUMINESCENT EXTERIOR PORTIONS

(75) Inventor: Melinda Donnelly, Sunderland (CA)

(73) Assignee: Flexmaster Canada Ltd. (CA)

( * ) Notice: Subject to any disclaimer, the term of this patent is extended or adjusted under 35 U.S.C. 154(b) by 0 days.

(21) Appl. No.: 13/190,596

(22) Filed: Jul. 26, 2011

(65) Prior Publication Data

US 2013/0025732 A1    Jan. 31, 2013

(51) Int. Cl.
*F16L 55/00*        (2006.01)

(52) U.S. Cl.
USPC ............................ 138/104; 138/178; 116/202

(58) Field of Classification Search
USPC .......................... 138/104; 116/205, DIG. 17
See application file for complete search history.

(56) References Cited

U.S. PATENT DOCUMENTS

| | | | | |
|---|---|---|---|---|
| 5,027,741 | A * | 7/1991 | Smith et al. | 116/205 |
| 5,182,954 | A * | 2/1993 | Menheere | 73/864.45 |
| 5,228,478 | A * | 7/1993 | Kleisle | 138/104 |
| 5,555,913 | A * | 9/1996 | Waidele et al. | 138/104 |
| 5,647,401 | A * | 7/1997 | Nobori | 138/126 |
| 6,955,189 | B1 * | 10/2005 | Weyker | 138/104 |
| 2002/0134448 | A1 * | 9/2002 | Goodman | 138/104 |
| 2006/0046093 | A1 | 3/2006 | Landry et al. | |
| 2009/0120350 | A1 | 5/2009 | Tamez, Jr. | |
| 2009/0188138 | A1 | 7/2009 | Murphy | |
| 2010/0006171 | A1 * | 1/2010 | Tomlin et al. | 138/104 |

FOREIGN PATENT DOCUMENTS

| | | |
|---|---|---|
| CN | 102121570 | 7/2011 |
| DE | 8311837 | 9/1983 |
| DE | 2005060221 | 7/2007 |
| EP | 143247 | 6/1985 |
| ES | 1041100 | 6/1999 |
| JP | 2001292513 | 10/2001 |

* cited by examiner

*Primary Examiner* — Patrick F Brinson
(74) *Attorney, Agent, or Firm* — Bourque and Associates, PA

(57) ABSTRACT

A hose or duct that is comprised of a rubber, plastic, metal, woven or non-woven textile or composite material is outfitted with a luminescent exterior member. The luminescent exterior member includes a luminescent material. The luminescent exterior member can be incorporated into the manufacture of the hose, or added to and/or around the exterior of the hose after manufacture of the hose. The luminescent exterior member may be wound around the hose in a spiral manner or may run longitudinally along a length of the hose in a single line or multiple lines. The luminescent exterior member may be fixably coupled to the hose with adhesive or molecularly bonded or with an attachment mechanism or the luminescent exterior member may be externally spiraled as a rigid spiral sleeve and thereby removable from the hose and may be reusable.

2 Claims, 4 Drawing Sheets

COMPOSITE HOSE WITH LUMINESCENT EXTERIOR PORTIONS

TECHNICAL FIELD

The present invention relates to hoses and more particularly, relates to a composite hose with a luminescent exterior portion.

BACKGROUND INFORMATION

Hoses are currently used to transfer or transport fluid material from one place to another. Hoses are used in many different environments to transfer many different types of materials. Sometimes hoses are used in environments of low or no light. In these environments, it is difficult to see hoses. Hoses can become safety issues causing someone to trip and fall. Additionally, if the hoses cannot be seen, they can be driven over or walked over, thereby causing gouges or cuts in the hose leading to accidental spills and/or injuries to those passing by or to bystanders.

Some hoses have used electrically powered lighting sources, however this causes the hose to be prohibitively expensive and can be dangerous in certain environmental conditions. Other hoses have utilized a reflective material, such as what is currently used on stop signs and other street signs. This reflective material requires a light source to be directed at the material in order to illuminate the material in darkness.

Accordingly, what is needed is a hose that is at least partially visible in low or no light. The hose should not require a source of light to be visible in the darkness. Additionally, the hose should not require a power source or electricity.

SUMMARY OF THE INVENTION

The present invention features a flexible conduit having a luminescent exterior element. The flexible conduit comprises a flexible conduit having an exterior region and a luminescent element including a luminescent material, disposed on the exterior region of the flexible conduit. In one embodiment, the flexible conduit is constructed from one or more materials selected from the group consisting of rubber, a plastic film, a fabric, a woven textile, a non-woven textile and a composite material.

In one embodiment, the luminescent element is incorporated into the exterior region of said flexible conduit during manufacturing of said flexible conduit while in another embodiment, the luminescent element is added to the exterior region after manufacturing of the flexible conduit. In this embodiment, the luminescent element may be molecularly bonded, adhered or mechanically fastened to the exterior region after manufacturing of the flexible conduit.

In one embodiment, the flexible conduit may include one luminescent element disposed along generally an entire length of said flexible conduit while in another embodiment there may be a plurality of luminescent elements disposed along generally an entire length of the flexible conduit.

In yet another embodiment, the luminescent element is a separate and removable luminescent element, separate and removable from the flexible conduit and disposed about the exterior region of the flexible conduit. The flexible conduit may be generally circular shaped and the separate and removable luminescent element may be a spirally shaped luminescent element spirally wound onto and around the exterior region of the generally circular shaped flexible conduit.

The luminescent element may have a shape or profile including, for example, a rounded profile, a flat profile, a "U" shaped profile or an "A" shaped profile.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
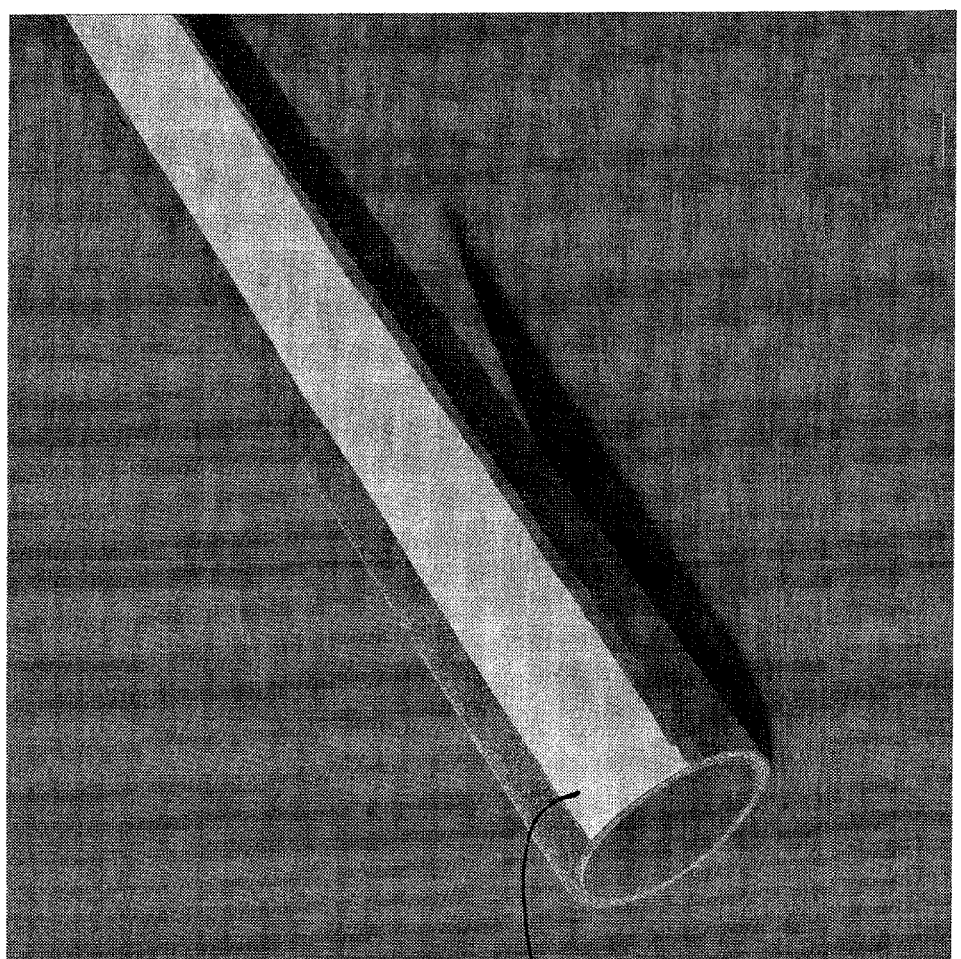
FIG. 1 is a detailed view of a hose with a luminescent exterior member according to one embodiment of the present invention.
Figure 2:
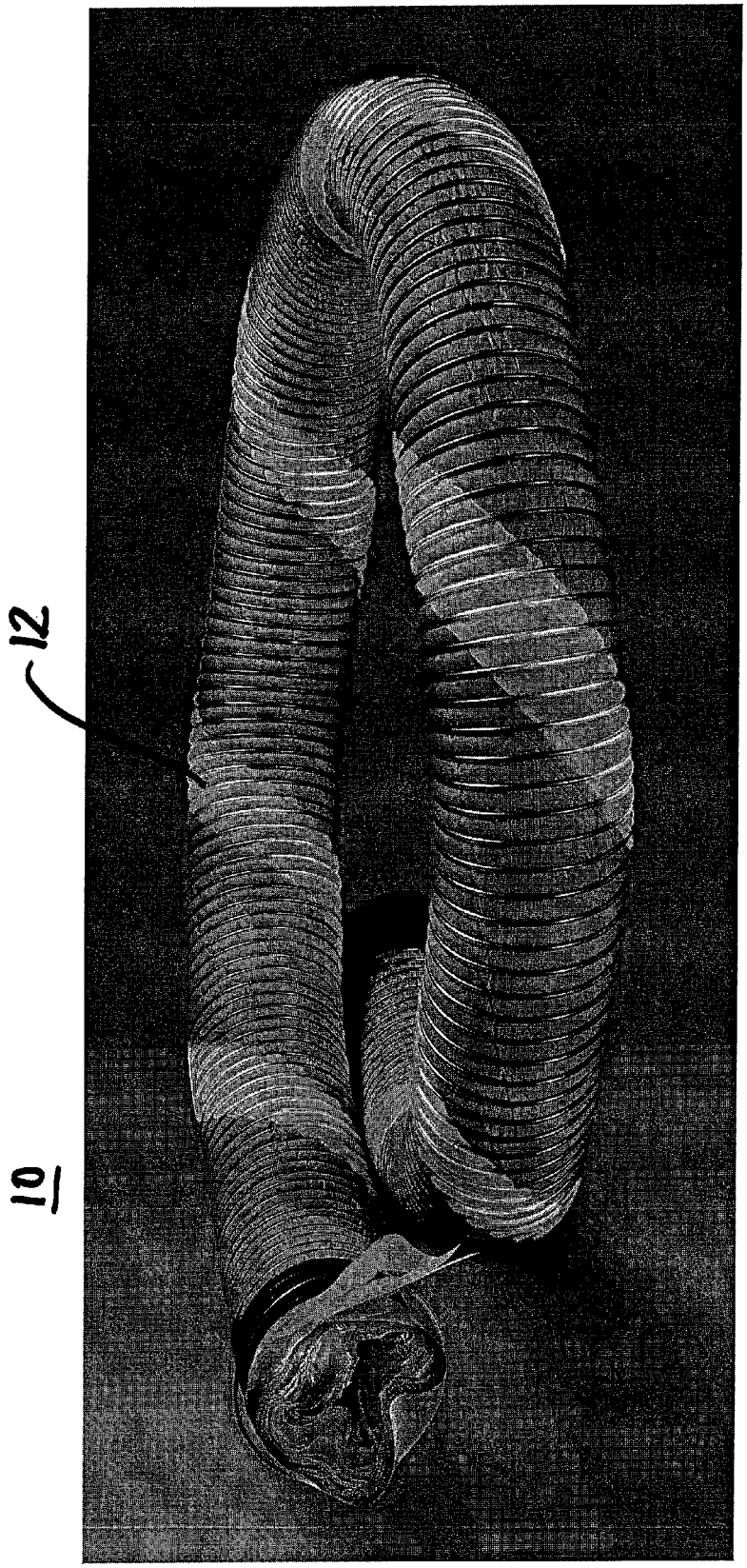
FIG. 2 is a detailed view of a hose with a luminescent exterior member according to one embodiment of the present invention.

In a first embodiment of the present invention, a hose 10, FIGS. 1 and 2, features a luminescent exterior portion or member 12 according to one embodiment of the present invention. The hose 10 may be a standard composite hose, a non-vulcanized rubber hose, a vulcanized rubber hose, a thermoplastic hose, metallic hose, or any another type of composite hose or textile duct. The luminescent exterior member 12 may be incorporated into the manufacture of the hose 10 or may be applied to the exterior surface of the hose 10 after the manufacture of the hose 12. The luminescent exterior member 12 may be present in a singular line (FIG. 1) or multiples lines (not shown) in a longitudinal manner along a length of the hose 10, or may alternatively be present in a wound or spiral pattern (FIG. 2) or in any other configuration. It is contemplated and within the scope of the invention that the luminescent exterior member 12 may be incorporated in the entire length of the hose 10 or in only one or more portions of the hose 10. The application of the luminescent exterior member 12 is flexible, whereby if only certain portions of the hose would benefit from the luminescent exterior member 12, then only those certain portions of the hose need to be marked with the luminescent exterior member 12.

The luminescent exterior member 12 is luminescent, rather than reflective. In this embodiment, the luminescent exterior member 12 contains a photoluminescent pigment. The pigment may be a rare-earth activated alkali earth aluminate-silicate photoluminescent pigment. As such, unlike conventional reflective materials that require a source of light to reflect off the material, the luminescent exterior member 12 of the present invention does not require a light source to reflect in order to visually see the hose 10 in darkness. The luminescent exterior member 12 receives and absorbs passive light from the sun or artificially from any light source, such as a conventional lighting source inside a building. After the hose has received and absorbed light from a light source, the luminescent exterior member 12 of the hose 10 lumeneses or "glows" in low or no light conditions, thereby allowing a user to see the hose 10 without the need for any additional light source or electricity. The luminescent exterior member 12 can be recharged over and over using a light source.

In this embodiment of the present invention, the luminescent exterior member 12 may be created from a naturally occurring luminescent material, which is then incorporated into a thermoplastic material and manufactured in the form of a tape or lay line of appropriate material to be added to or incorporated into a composite hose. When the luminescent exterior member 12 is wound or laid along the hose 10, the luminescent exterior member 12 may be secured permanently or temporarily. Methods of securing the luminescent exterior member 12 may be accomplished during the manufacture of the hose or after the manufacture of the hose.

In a first method of securing the luminescent exterior member 12 to the hose 10, the luminescent exterior member 12 is molecularly bonded to the hose 10 without the use of adhesives utilizing a heat curing process with or without an intermediary layer. In this method, the luminescent exterior member 12 may be a single line, multiple lines, a lazy spiral, or any other configuration. In a second method of securing the luminescent exterior member 12 to the hose 10, the luminescent exterior member 12 is wound or run longitudinally down the hose 10 and secured by way of an externally wound wire or another comparable mechanical attachment or may be attached using an appropriate adhesive.

Figure 3:
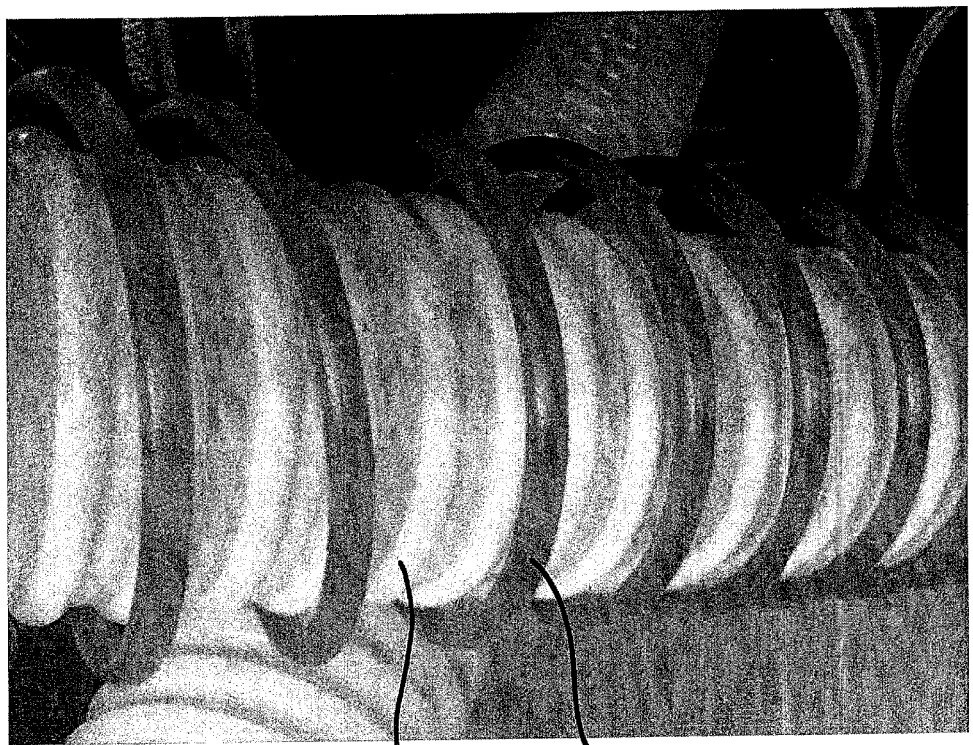
FIG. 3 is a detailed view of a hose with a luminescent exterior member according to a second embodiment of the present invention.
Figure 4:
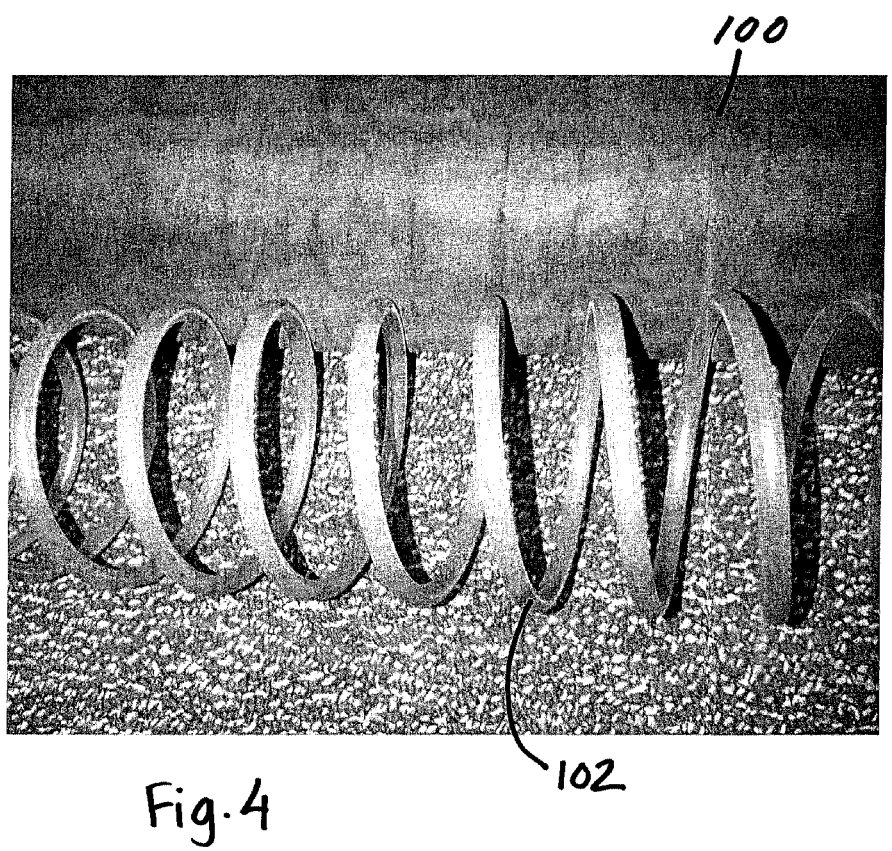
FIG. 4 is a detailed deconstructed view of a hose with a luminescent exterior member according to a second embodiment of the present invention.

In another embodiment of the present invention, the hose 100, FIGS. 3 and 4, includes a luminescent exterior member 102. The hose 100 can be any hose or duct, including but not limited to, a hose or duct made of rubber, plastic, metal, woven or non-woven textile or composite. The luminescent exterior member 102 of this embodiment is configured to surround at least a portion of the hose 100 in a spiral format. Such a luminescent exterior member 102 may be added to almost any previously manufactured hose. The luminescent exterior member 102 may feature a rounded or flat profile, a "U" shape, an "A" shape or any other shape, all without departing from the scope and spirit of the present invention. The luminescent exterior member 102 may have a "slinky" quality in that it is externally spiraled as a rigid spirals sleeve and can be moved and compressed or decompressed as it is placed onto a hose or removed from a hose.

FIG. 3 details the hose 100 with the luminescent exterior member 102 in use surrounding the hose 100. FIG. 4 shows the hose 100 with the luminescent exterior member 102 separate from and alongside the hose 100. In use, the luminescent exterior member 102 is "threaded" or "spiraled" around a length of 100 hose and exists as a separate external piece of the hose 100. As such, the luminescent exterior member 102 can also be used interchangeably among any type of hose, retrofitted to be added to any previously manufactured hose, and can be removed from a first hose and placed into use on second hose. An alternate embodiment would include securing the luminescent exterior member 102 to the hose via a molecular bond.

As in the first embodiment of the present invention, this second embodiment preferably features a luminescent exterior member 102 that is comprised at least partially of a luminescent material, such as a luminescent pigment. The pigment may be a rare-earth activated alkali earth aluminate-silicate photoluminescent pigment. The luminescent material is configured to absorb artificial or natural light and provide an illuminated or glowing light source in darkness, thereby allowing a user to visualize the hose in low or no light without the need for an additional light source. The luminescent exterior member 102 can be recharged over and over.

Accordingly, the present invention provides a luminescent member which can be either incorporated into a composite hose during the manufacturing process or alternatively, be provided as a separate member which can be added to a previously manufactured hose. The luminescent member provides a visual indication to users and bystanders of the existence, presence and position of the hose.

Modifications and substitutions by one of ordinary skill in the art are considered to be within the scope of the present invention, which is not to be limited except by the allowed claims and their legal equivalents.

What is claimed is:

1. A flexible conduit having a luminescent exterior element, said flexible conduit comprising:
    a flexible conduit having an exterior region, wherein said flexible conduit has a length and is constructed from one or more materials, in any combination, selected from the group of materials consisting of rubber, thermoplastic, a plastic film, a fabric, a woven textile, a non-woven textile, metal, foil and a composite material; and
    at least one spirally shaped luminescent element including a luminescent material, disposed on and in contact with but not attached to said exterior region of said flexible conduit, wherein said luminescent element is a separate and removable luminescent element, separate and removable from said flexible conduit and disposed about said exterior region of said flexible conduit, wherein said flexible conduit is generally circular shaped and wherein said separate and removable luminescent element is a spirally shaped luminescent element spirally wound onto and around but not attached to at least a portion of said length of said exterior region of said generally circular shaped flexible conduit.

2. The flexible conduit of claim 1, wherein said at least one luminescent element is of a shape or profile selected from the group consisting of a rounded profile, a flat profile, a "U" shaped profile and an "A" shaped profile.

* * * * *